(12) United States Patent
Gass

(10) Patent No.: US 8,652,609 B2
(45) Date of Patent: Feb. 18, 2014

(54) CORNER PLATE WITH SLED FEATURE

(75) Inventor: Chris Gass, Charlotte Hall, MD (US)

(73) Assignee: Production Products, Inc., Charlotte Hall, MD (US)

( * ) Notice: Subject to any disclaimer, the term of this patent is extended or adjusted under 35 U.S.C. 154(b) by 193 days.

(21) Appl. No.: 13/357,754

(22) Filed: Jan. 25, 2012

(65) Prior Publication Data

US 2013/0189477 A1    Jul. 25, 2013

(51) Int. Cl.
*F16L 23/00* (2006.01)
(52) U.S. Cl.
USPC .............. 428/80; 428/99; 428/131; 285/405
(58) Field of Classification Search
USPC .............. 428/80, 99, 131; 285/405; 403/295
See application file for complete search history.

(56) References Cited

U.S. PATENT DOCUMENTS

| | | |
|---|---|---|
| 2,785,035 A | 3/1957 | Hammer |
| D231,430 S | 4/1974 | Steinhauser |
| 4,244,609 A | 1/1981 | Smitka |
| 4,466,641 A | 8/1984 | Heilman et al. |
| 4,542,923 A | 9/1985 | La Crosse et al. |
| 4,558,892 A | 12/1985 | Daw et al. |
| 4,584,756 A | 4/1986 | Arnoldt |
| 5,005,879 A | 4/1991 | Jackson |
| 5,069,484 A | 12/1991 | McElroy |
| 5,165,730 A | 11/1992 | McElroy |
| 5,283,944 A | 2/1994 | Goodhue |
| 5,342,100 A | 8/1994 | Goodhue |
| 5,564,758 A | 10/1996 | Tiberio |
| 6,428,056 B1 | 8/2002 | Issagholian-Havai |

FOREIGN PATENT DOCUMENTS

GB    2216212 A    4/1989

*Primary Examiner* — Alexander Thomas
(74) *Attorney, Agent, or Firm* — Dickstein Shapiro LLP

(57) ABSTRACT

A corner plate for connecting pieces of duct that facilitates automatic feeding and provides horizontal stack stabilization. The corner plate includes sled features that provide regular and even vertical spacing when stacked. The sled features also interact with an adjacent corner plate allowing motion in a feed direction to facilitate automatic feeding while resisting lateral motion in a non-feeding direction to stabilize the stack of corner plates in a horizontal direction. The corner plate also includes tabs that prevent nesting and facilitate automatic feeding.

11 Claims, 5 Drawing Sheets

CORNER PLATE WITH SLED FEATURE

FIELD

The present disclosure relates to a corner plate used to connect one duct to another duct and, more particularly, to a corner plate that includes a sled feature to prevent nesting while providing superior reliability when used in automated operations.

BACKGROUND

It is well known to attach ducts to one another by situating corner plates in flanges formed at the end of each duct. The corner plates are situated and retained in the flanges such that an exposed portion of the corner plate with a hole defined therein can be aligned to a corner plate situated in the flange of another duct. A fastener, such as bolt, can be passed through the aligned holes in the corner plates and secured, attaching the corner plates and the respective ducts to one another. This method of attachment is shown and discussed in U.S. Pat. No. 4,466,641 to Heilman et al. and U.S. Pat. No. 4,542,923 to La Crosse et al.

Techniques have also been developed to automate the process of installing the corner plates on the ducts. Machines are now used to install the corner plates and fix them in place. These machines use automatic feeders in which corner plates are fed one by one from the bottom of a stack of corner plates. To facilitate the automatic feeding, the corner plates were reconfigured to facilitate the formation of an orderly stack; the automatic feeding process requires that the corner plates maintain repeatable and even vertical spacing when stacked. This requires the corner plates to be configured such that they do not nest within one another when stacked. To achieve the desired stacking and anti-nesting characteristics, vertical tabs were added to the corner plates. One example of a corner plate installation machine, automatic feeder, and related corner plate can be seen in U.S. Pat. Nos. 5,283,944 and 5,342,100 to Goodhue.

One drawback of the conventional corner plates equipped with tabs to achieve vertical separation is that they fail to provide lateral stability to the stack. Traditional tabs do nothing to prevent a corner plate from moving laterally relative to an adjacent corner plate in the stack, which could cause feeding problems. Additionally, the shape of the tabs impacts the anti-nesting characteristics and the reliability of the corner plates when used in an automatic feeder. It would be beneficial to have a corner plate that provides improved stacking and anti-nesting characteristics while also resisting lateral movement in a direction perpendicular to the feed direction.

SUMMARY

The present disclosure provides a new corner plate that facilitates automatic feeding in a corner plate installation machine while preventing lateral movement in a non-feeding direction.

The corner plate of the present disclosure provides regular and even vertical stacking while resisting lateral motion in a direction other than the feeding direction, thus stabilizing the stack and facilitating automatic feeding when used in a corner plate installation machine. This is achieved by using sled features as opposed to traditional tabs. The sled features provide vertical spacing similar to traditional tabs, but interact with openings in adjacent corner plates to provide lateral stabilization of the stack that traditional tabs cannot achieve.

The corner plate of the present disclosure also includes a new tab design that improves anti-nesting characteristics while adding additional reliability to the automatic feeding process. The tabs in the presently disclosed corner plate include rounded front and rear corners compared to traditional tabs that generally have sharper more square corners. The rounded shape of the currently disclosed tabs improves the anti-nesting behavior and prevents a tab from snagging on an adjacent corner plate, which can jam an automatic feeder.

The location of the tabs is an additional improvement over traditional corner plates. Traditionally, it was common to form the tabs as part of the mounting hole, but doing so requires longer fasteners and limits fastener contact area. The traditional arrangement often results in deformation of the tabs during installation due to the tightening of the fastener that results in a loose connection and sloppy fit. Locating and forming the tabs separate from the mounting hole maximizes fastener contact area and allows the use of shorter fasteners. This results in tighter and more consistent connections.

In one form, the present disclosure provides a corner plate for connecting pieces of duct including a central portion, at least two extension portions connected to the central portion, a first vertical separation feature formed at the central portion, a second vertical separation feature formed at one of the at least two extension portions, and a third vertical separation feature formed at the other of the at least two extension portions. At least one of the first, second, or third vertical separation features is a sled feature. The sled feature is configured to allow movement relative to an adjacent corner plate in a first lateral direction while resisting movement in a second different lateral direction when stacked atop another corner plate.

In another form, the present disclosure provides a corner plate for connecting pieces of duct including a central portion, two extension portions connected to the central portion, and at least one sled feature connected to the corner plate at two separate portions thereof. The corner plate being configured such that when the corner plate is stacked vertically atop another similar corner plate the at least one sled feature interacts with an opening defined in the adjacent corner plate to allow movement in a first lateral direction while resisting movement in a second lateral direction.

In another form, the present disclosure provides a corner plate including a center portion, two extension portions connected to the center portion in a perpendicular arrangement, a tab at the central portion, a sled at the first extension portion, and a second sled at the second extension portion.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
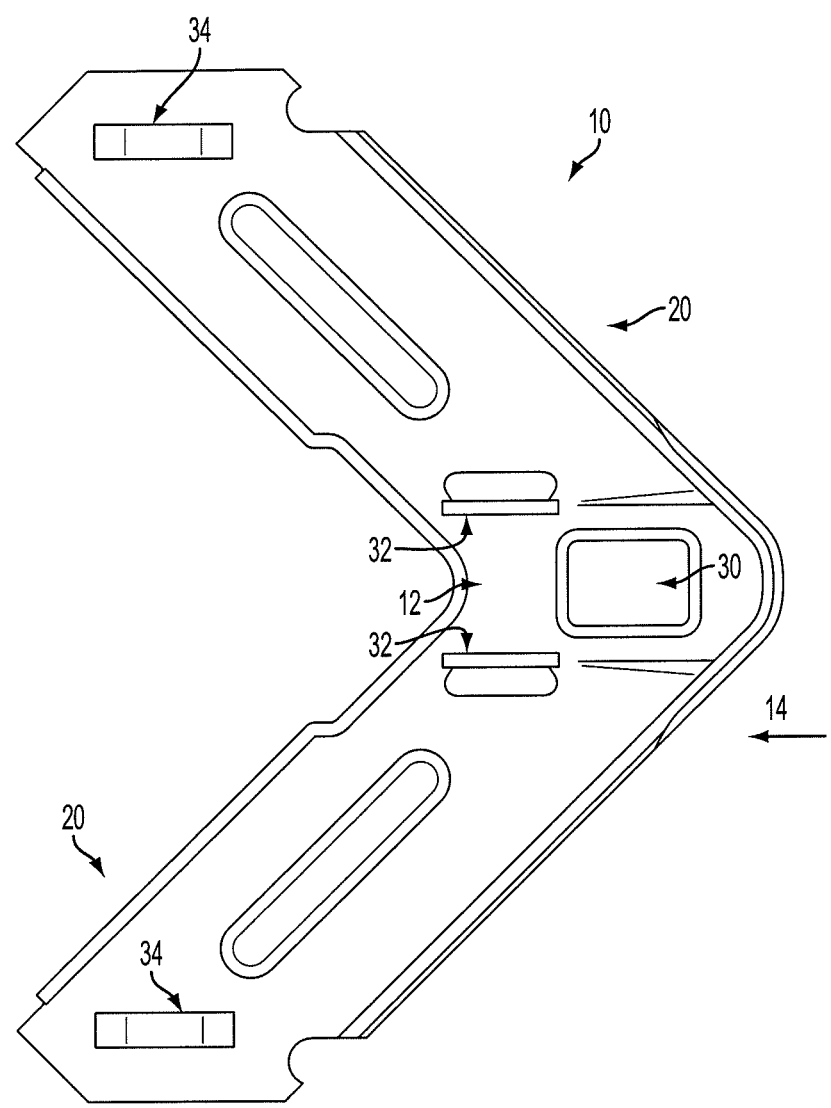
FIG. 1 is a bottom view of a corner plate in accordance with the present disclosure.

The present disclosure provides a new corner plate, which facilitates regular and even vertical stacking while resisting lateral motion in a direction other than the feeding direction. The phrase "feeding direction" refers to the direction the corner plate is automatically fed when used in a corner plate installation machine. The disclosed corner plate includes sled features that provide vertical separation and prevent nesting while resisting lateral movement in any direction other than the feeding direction. In particular, the sled feature allows lateral movement in the feeding direction while resisting lateral movement in a non-feeding direction by interacting with an opening in an adjacent corner plate.

The corner plate of the present disclosure also includes a new tab design and arrangement that improves anti-nesting characteristics and facilitates more consistent automatic feeding. The tabs of the current corner plate include rounded front and rear corners that prevent nesting and keep tabs from snagging an adjacent corner plate, which can jam the automatic feeding process. The tabs are also formed and located separate from the mounting hole. This allows an installer to use shorter fasteners to connect adjacent duct sections and also maximizes fastener contact area.

Referring now to the drawings, FIGS. 1-5 illustrate an embodiment of a corner plate 10 according to the present disclosure. The corner plate 10 is made of metal, but could be made of any suitable material for connecting duct work. The corner plate 10 includes a central portion 12 with a mounting hole 30 defined therethrough. In use, mounting holes 30 from corner plates 10 on different pieces of duct are aligned and then a fastener is passed through the mounting holes 30 to connect the corner plates, in turn connecting the ducts. When used in an automatic feeder, corner plates 10 are fed along a feeding direction indicated by arrow 14.

Central portion 12 also contains two vertical separation features 32. In this embodiment, the vertical separation features 32 are shown as tabs that are punched through the corner plate 10, but other vertical separation features may be used. In particular, rather than tabs, the vertical separation features 32 can be formed as sled features similar to sled features 34. Vertical separation features 32 prevent the corner plates 10 from nesting when stacked and provide regular and even vertical separation between central portions 12 of adjacent corner plates in a stack.

Figure 3:
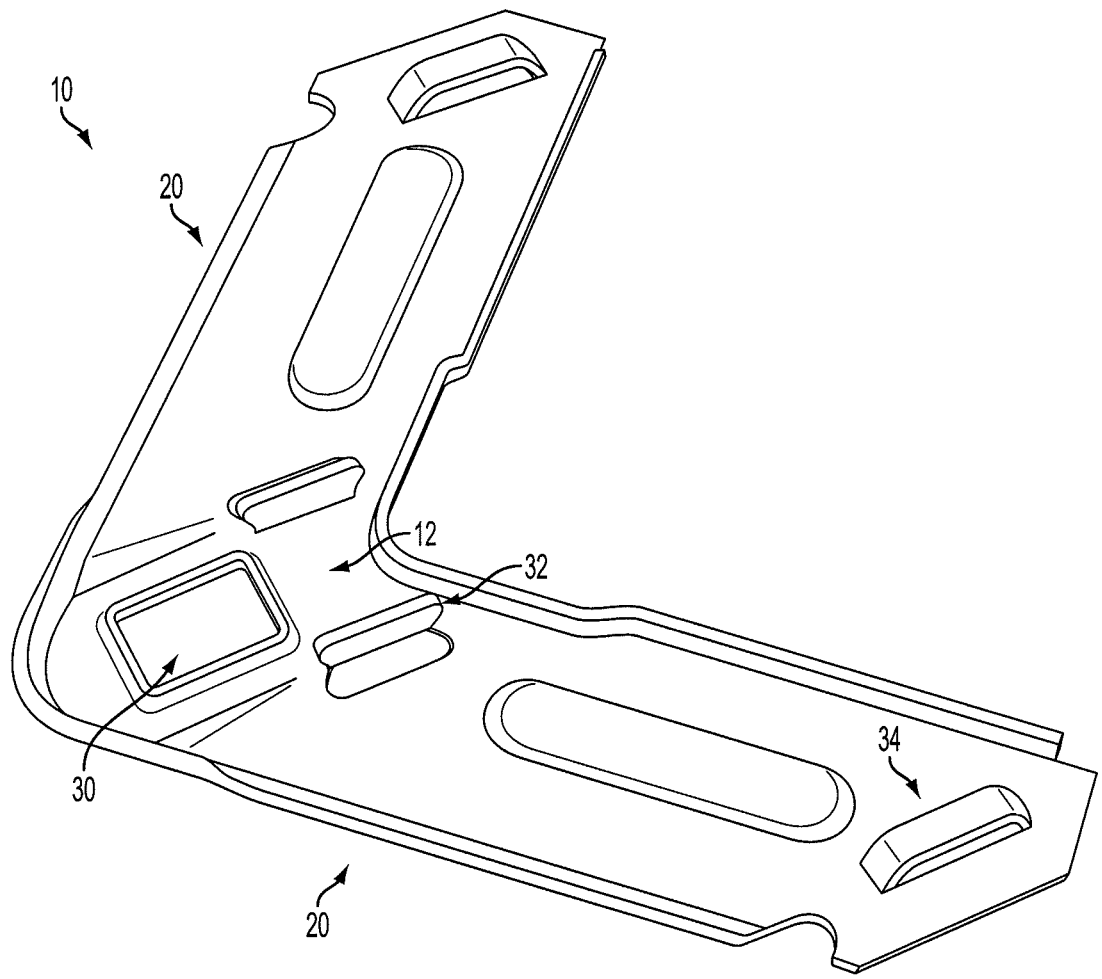
FIG. 3 is a bottom perspective view of a corner plate in accordance with the present disclosure.
Figure 4:
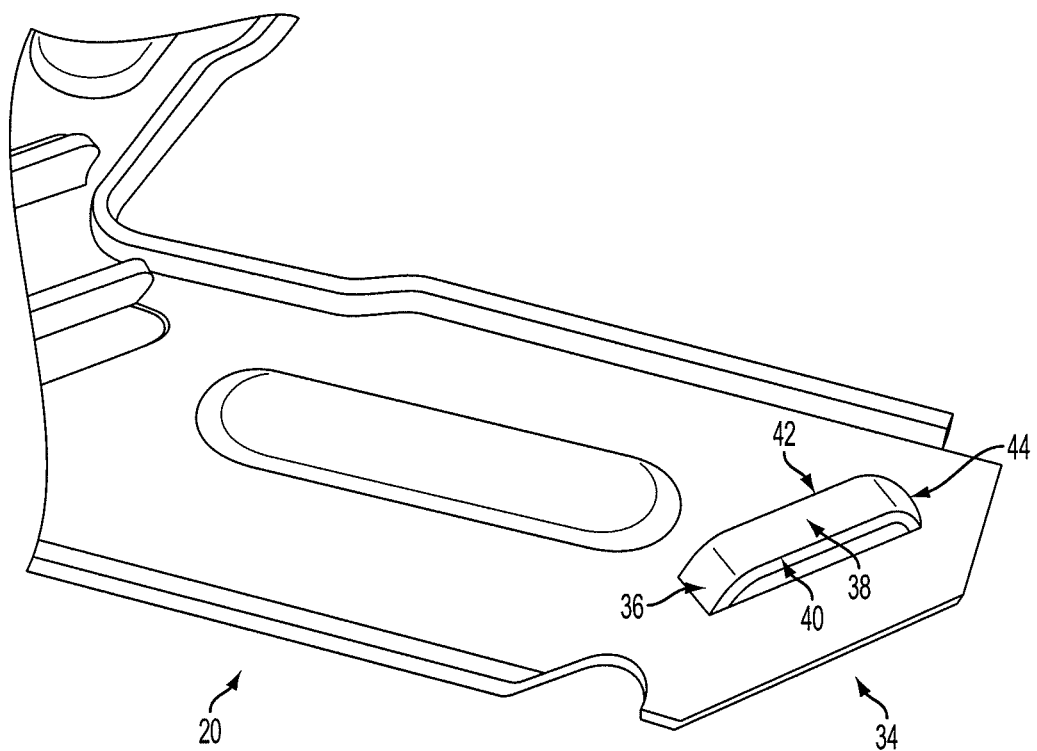
FIG. 4 is a bottom perspective view of a portion of a corner plate in accordance with the present disclosure.

The tabs 32 disclosed herein have rounded front and rear corners as can be seen in FIG. 3. This shape improves anti-nesting behavior because the width of each tab 32 at the loose end is greater than the width of the tab 32 where it connects to the corner plate (see FIG. 3). This prevents the tab 32 from catching on a hole in an adjacent corner plate during automatic feeding. The rounded corners also ensure that the tabs 32 can slide easily relative to an adjacent corner plate in the feeding direction. The tabs 32 are not formed as part of the mounting hole 30, but rather are formed in an adjacent area in the center portion 12. This allows mounting hole 30 to have a lower profile, which facilitates the use of shorter fasteners and increases fastener contact area.

Extending from center portion 12 are two extension sections 20. Generally, extension sections 20 are perpendicular to one another for use in ducts with rectangular or square cross sections, but other arrangements can be used for ducts with irregular cross sections. Each extension section 20 includes a vertical separation feature 34 generally located at an end of the extension section 20 remote from the central portion 12. Vertical separation features 34 are formed as sled features. Similar to vertical separation features 32, sled features 34 provide regular and even vertical separation between extension portions 20 of adjacent corner plates in a stack. Unlike tabs, however, sled features 34 also resist lateral movement in a non-feeding direction when the corner plates 10 are stacked. This advantage is discussed in more detail below.

Figure 2:
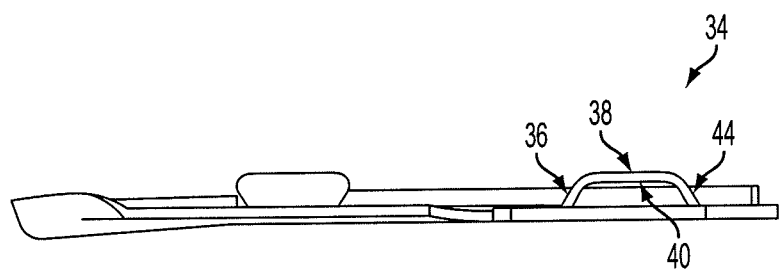
FIG. 2 is a side view of a corner plate in accordance with the present disclosure.

FIG. 2 is a side view of the corner plate 10 in which the details of a sled feature 34 are shown more clearly. Unlike tabs, such as tabs 32, which are only connected to the corner plate 10 along one edge, the sled features 34 are connected to corner plate 10 along two edges. As seen in FIG. 2, each sled feature 34 is connected to the corner plate 10 by a sloped front portion 36 and a sloped rear portion 44. Each sled feature 34 also includes a bottom contact surface 38. The bottom contact surface 38 includes sled sides 40 and 42 (best seen in FIG. 4).

Figure 5:
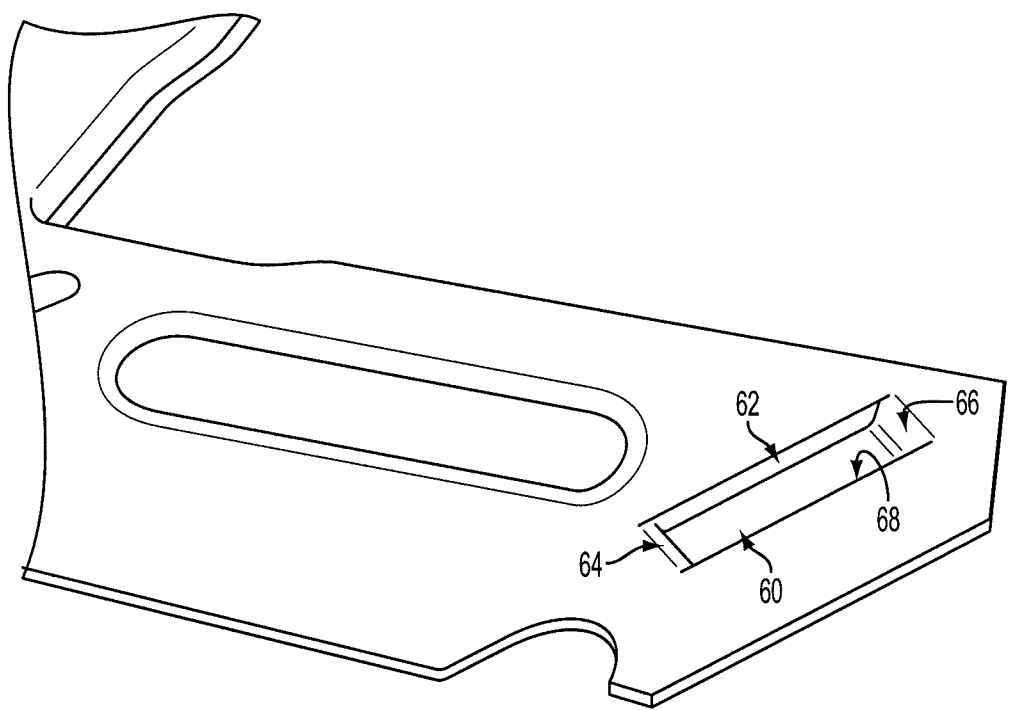
FIG. 5 is a top perspective view of a portion of a corner plate in accordance with the present disclosure.

FIG. 5 is a perspective view of the top of an extension section 20 of the corner plate 10. When sled features 34 are formed, an opening 60 is defined in the corner plate 10. The opening 60 has a front curved edge 64 and a rear curved edge 66. The front curved edge 64 is the point at which a sloped front portion 36 connects the sled feature 34 to the corner plate 10. The rear curved edge 66 is the point at which a sloped rear portion 44 connects the sled feature 34 to corner plate 10. As can be seen, the opening 60 also includes generally vertical sides 62 and 68.

When the sled features 34 are formed, extra tonnage is exerted at the bottom of the stroke to slightly widen and flatten the bottom of the sled feature 34. Thus, the bottom contact surface 38 is slightly wider than opening 60. This provides anti-nesting behavior as the bottom contact surface 38 of one corner plate can not become lodged in the opening 60 of an adjacent corner plate in a stack.

When stacked, the sloped front portion 36 and sloped rear portion 44 of the sled feature 34 interact with the front curved edge 64 and rear curved edge 66, respectively, of an adjacent corner plate. The sled sides 40, 42 contact the generally vertical sides 62, 68 of the opening 60 of the adjacent corner plate. The shape of the sloped front portion 36 and sloped rear portion 44 interacting with the front and rear curved edges 64, 66, respectively, of an adjacent corner plate provide minimal resistance to lateral movement in the feeding direction 14. This is in contrast with the interaction of the sled sides 40, 42 with the generally vertical sides 62, 68 of the opening 60 of an adjacent corner plate (explained below).

The shape and interaction of the sled sides 40, 42 with the sides 62, 68 of the opening 60 of an adjacent corner plate provides resistance to lateral motion in a non-feeding direction. Thus, the shape of the sled allows for motion in the feeding direction, but prevents corner plates from laterally sliding relative to one another in a non-feeding direction; this improves the horizontal stability of a stack of corner plates 10. Sled features, as disclosed herein, therefore provide regular and even vertical separation and anti-nesting characteristics while further providing horizontal stabilization of the stack by resisting lateral motion in a non-feeding direction.

While a particular arrangement of tabs and sled features has been shown, it should be recognized that any number of configurations are envisioned. By way of example only, it would be possible to use any number of sled features 34 on a corner plate 10 or to include exclusively sled features 34 without any tabs. These and any other variations are considered to be within the scope of this disclosure.

What is claimed is:

1. A corner plate for connecting pieces of duct comprising: a central portion, at least two extension portions connected to the central portion, a first vertical separation feature formed at the central portion, a second vertical separation feature formed at one of the at least two extension portions, and a third vertical separation feature formed at the other of the at least two extension portions, wherein at least one of the first, second, or third vertical separation features is a sled feature;
wherein the at least one sled feature is connected to the corner plate along at least two edges of the sled feature; and
wherein formation of the at least one sled feature creates a sled opening in the corner plate.

2. The corner plate of claim 1, wherein the at least one sled feature is configured to allow movement relative to an adjacent corner plate in a first lateral direction while resisting movement in a second different lateral direction when stacked atop another corner plate.

3. The corner plate of claim 1, wherein the first vertical separation feature comprises a pair of vertical separation features.

4. The corner plate of claim 3, wherein the pair of vertical separation features comprises tabs formed in the central portion.

5. The corner plate of claim 4, wherein the tabs include rounded edges.

6. The corner plate of claim 1, wherein the corner plate further comprises a mounting hole defined in the central portion and the first vertical separation feature is separated from the mounting hole.

7. The corner plate of claim 1, wherein both the second and third vertical separation features are sled features each connected to the corner plate along at least two edges of the sled feature.

8. The corner plate of claim 1, wherein the at least one sled feature is connected to the corner plate along a front and rear edge of the sled opening.

9. The corner plate of claim 8, wherein the at least one sled feature includes front and rear sloped portions connected to the front and rear edges of the sled opening.

10. The corner plate of claim 8, wherein the front and rear edges of the sled opening are separated by two substantially vertical sled opening sides and the front and rear sloped portions are separated by two substantially vertical sled sides.

11. The corner plate of claim 10, wherein the substantially vertical sled sides interact with the substantially vertical sled opening sides of an adjacent corner plate to resist movement in the second different lateral direction when stacked atop another corner plate.

* * * * *